United States Patent [19]

Page et al.

[11] Patent Number: 5,326,055
[45] Date of Patent: Jul. 5, 1994

[54] UNIVERSAL HORIZONTAL AND VERTICAL SIDING CLIP

[75] Inventors: Mark Page; Donald Santucci, both of Naperville, Ill.

[73] Assignee: DEK, Inc., St. Charles, Ill.

[21] Appl. No.: 76,401

[22] Filed: Jun. 14, 1993

[51] Int. Cl.5 .................................................. F16L 3/08
[52] U.S. Cl. ........................................ 248/74.3; 248/65
[58] Field of Search ................. 248/68.1, 65, 71, 73, 248/74.1, 74.3; 174/148, 158 R, 163 R

[56] References Cited

U.S. PATENT DOCUMENTS

| 2,105,112 | 1/1938 | Flower | 248/65 X |
| 2,241,657 | 5/1941 | Dehring | 248/71 |
| 2,471,584 | 5/1949 | Richards | 248/71 X |
| 2,710,888 | 6/1955 | Edwards | 174/148 X |
| 3,210,030 | 10/1965 | Ramsey | 248/71 |
| 3,307,811 | 3/1967 | Anderson | 248/73 X |
| 3,503,580 | 3/1970 | Levy | 211/107 X |
| 3,632,070 | 1/1972 | Thayer | 248/68.1 |
| 3,794,751 | 2/1974 | Farmer | 248/65 X |
| 4,819,897 | 4/1989 | Gooding | 248/68.1 |

FOREIGN PATENT DOCUMENTS 853347  3/1940  France ...................... 174/158 R Primary Examiner—J. Franklin Foss
Attorney, Agent, or Firm—Maksymonko & Slater

[57] ABSTRACT

A universal plastic siding clip for attaching cables and wires to the outside of a building. The siding clip includes cooperating cable retention mechanisms for both horizontal cable spans and vertical cable drops thereby permitting the use of a single fastener for either or both types of cable runs. The retention mechanisms are spaced to avoid cable interference where both cable types are utilized and, further, to position horizontal cables closer to the wall surface thus making use of the intrinsic protection offered by overlapping siding planks while the vertical runs are spaced sufficiently outwardly from the wall surface to avoid interference with such overlapping planks. Cable recesses are provided to permit multiple and widely varying cable cross-sections and diameters in a single clip model. Further, the clip may be injection molded using simplified tooling without movable core members, side actions and similar apparatus that otherwise increases manufacturing costs.

8 Claims, 1 Drawing Sheet

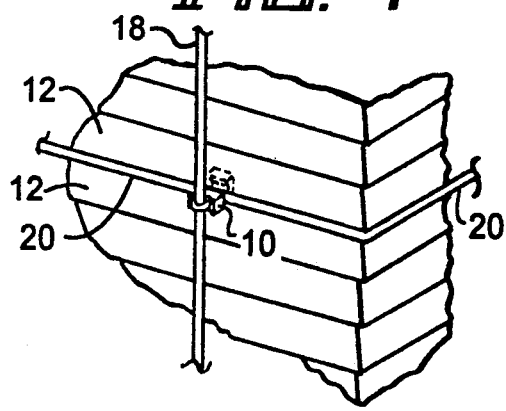
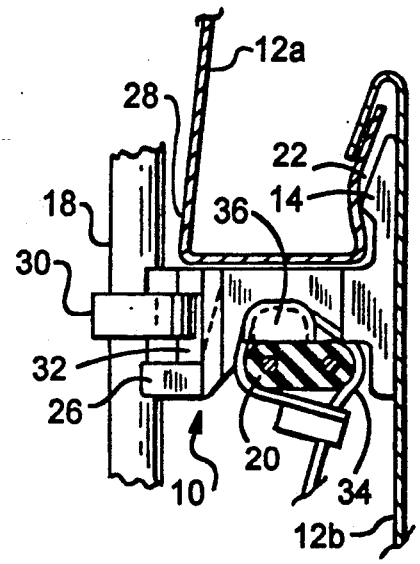
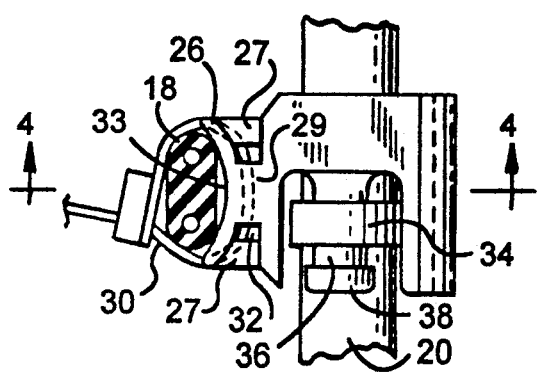
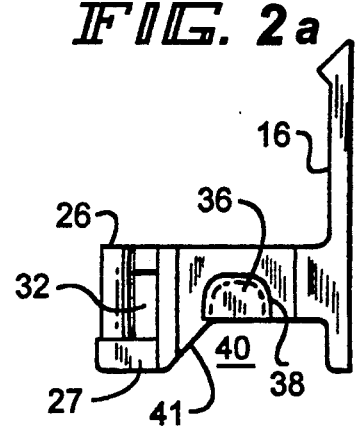
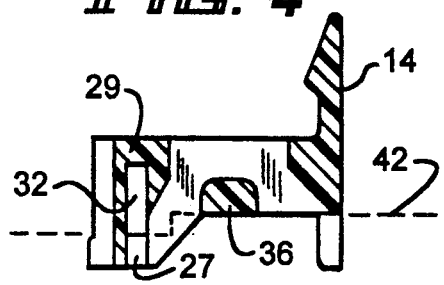
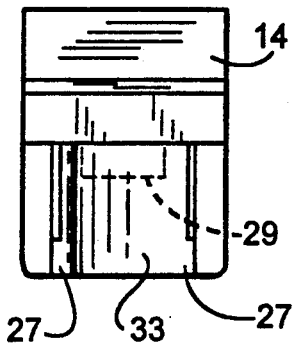
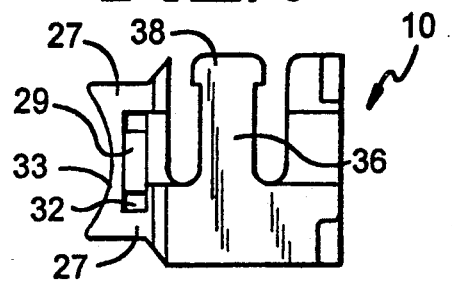

UNIVERSAL HORIZONTAL AND VERTICAL SIDING CLIP

BACKGROUND OF THE INVENTION

The present invention relates to plastic clips for the retention of electrical wires and cabling against, generally, the exterior surface of a building. More specifically, the present clip falls within the family of fasteners intended to attach such wires and cables to a building surface without screws, nails or otherwise defacing the surface.

One common form of exterior siding comprises plural aluminum sections or wood planks arranged horizontally and in overlapping fashion. The interlace between adjacent sections defines a recess or receptacle into which a flanged (or barbed) portion of a clip may be inserted by urging the clip perpendicularly into the recess thereby securing same to the wall surface. Although not as common, siding may also be arranged in vertical sections. Whether vertical or horizontal, the recesses defined between adjacent sections are unidirectional, i.e. parallel, as are the corresponding, although perpendicular, paths for clip insertion. Thus, for any given wall surface, all siding clips must be inserted in the same direction.

It will be appreciated that this limitation restricts the placement of siding clips by forcing all siding clips to be oriented in a single, common direction. As most known clips are designed to receive wires or cables in a single orientation with respect thereto, multiple clip models are generally required—so-called horizontal and vertical clips—where both lateral as well as drop cable runs are contemplated. The present invention, on the other hand, pertains to a universal clip arrangement suitable for use on an aluminum or other planked siding having unidirectional, longitudinal interfaces therebetween while facilitating the retention of wires and cables oriented vertically, horizontally, or both.

A further limitation of many known clip structures is the relatively limited range of wire and cable sizes that any given clip can accommodate. Thus, a family of clip sizes must be provided, and, for each mounting orientation. By contrast, the present clip incorporates conventional cable ties for wire attachment (to the clip body portion) which ties, in turn, permit retention of a wide range of cable cross-sections. And further flexibility can be realized by selecting cable tie sizes according to the number and diameter of cables requiring attachment.

Clips employing cable ties for wire attachment are not unknown. One such clip, for example, is the anchor sold under the TAPIN trademark by Illinois Tool Works. This clip, however, is literally nailed to a wall surface thereby causing the associated problems of wall defacement and surface breach. The present clip does not, in the first instance, employ a surface-breach mounting arrangement. Further, the clip described herein permits retention of vertical as well as horizontal cable spans and, importantly, both spans may be accommodated with a single clip structure.

The lower portion of the clip (i.e. the portion closest to the wall surface) advantageously provides the support and retention of cables oriented generally parallel to the longitudinal siding sections or planks. In most installations these will be horizontal cable 'spans'. More specifically, a cantilever armature member facilitates the "side-loading" attachment of cables to the clip body (using, as previously noted, a cable tie around the cables and armature member) whereby the cable tie may be cut or slipped-off the armature thereby allowing the installation, removal, replacement, and/or repositioning of horizontal cable spans without the necessity for a corresponding replacement or repositioning of a previously installed clip or any vertical cables connected thereto.

A further feature of the side-loading attachment is the orientation of the wire or cable adjacent the clip and immediately proximate the wall surface. In this manner the cable is positioned in the recessed region generally found at the interface between adjacent siding sections and protected by the raised portion of siding defined by the overlapping of one section on the other.

A wholly different "top-loading" retention is proposed for the vertical or "drop" cables that, in the first instance, spaces apart the respective horizontal and vertical cables (where the present clip is employed to advantageously position and attach cables in both orientations) while, secondly, positioning the drop cable sufficiently above the wall surface to assure that such cable will clear the ridges created by the previously discussed overlapping of adjacent siding sections. It will again be appreciated that the vertical drop cables may be attached or reattached to an installed clip without need for clip or horizontal wire removal or repositioning.

Both clip cable retention regions define contours or channels against or through which the respective span and drop cables are directed. These contours are importantly dimensioned and contoured to permit clip use with the widest possible range of cable and wire types and sizes.

The present clip is further and advantageously designed to facilitate the greatest economy in manufacture. Specifically, the clip is preferably fabricated utilizing conventional plastic injection molding technology and, to the end of further economy, the present clip—although being of complex design by reason of its treatment of orthogonal cables (i.e. along "x" and "y" axes) and spacing of such cables in yet a third dimension (i.e. along the "z" axis)—is designed whereby the molds may be of the simple parting type, that is, where complex and expensive side actions, lifters, slide locks, or similar tooling systems are not required. In this manner the tool is not only cheaper in its original manufacture, but less expensive to maintain, less likely to fail or require maintenance, and may be cycled more rapidly.

It is therefore an object of the present invention to provide a siding clip for the retention of wires and cables against exterior wall surfaces that is economical to fabricate and effortless to install; that does not deface the wall surfaces on which it is mounted; provides for the retention of cables of multiple orientations, in particular horizontal and vertical; has the capability of retaining both such cables simultaneously; accommodates cables of widely varying cross-section and size; permits the attachment and reattachment of cables without a corresponding need to reposition or reattach the clip or other cables; positions cables close to the wall and in sheltered, protected relationship thereto, but spaces cables away from the wall as required to effect cable crossings and to avoid siding interferences for cables oriented transversely to the siding sections or planks; and, facilitates the manufacture thereof in an economical manner.

These and other objects are more fully explicated in the drawings, specification, and claims that follow.

BRIEF DESCRIPTION OF THE DRAWINGS

FIG. 1 is a perspective view of the universal siding clip of the present invention shown installed on a building wall with both vertical drop and horizontal span cables connected thereto;

FIG. 2 is a front elevation view of the universal siding clip of FIG.1 shown with attached vertical and horizontal cables;

FIG. 2a is a front elevation view of a second embodiment of the universal siding clip having an elongated insertion flange thereon and shown without vertical or horizontal cables attached;

FIG. 3 is a top horizontal view of the universal siding clip of FIG. 2;

FIG. 4 is a sectional view of the universal siding clip taken along line 4—4 of FIG. 3 shown with vertical and horizontal cables removed;

FIG. 5 is a left elevation view of the universal siding clip of FIG. 2 with cables removed; and, FIG. 6 is a bottom view of the universal siding clip of FIG. 2 with cables removed.

DESCRIPTION OF THE PREFERRED EMBODIMENT

FIG. 1 illustrates the universal siding clip 10 of the present invention installed between adjacent and adjoining aluminum, wood or similar horizontal planking members 12. Clip 10 is retained by sliding an appropriately dimensioned barbed tab member into the recess defined between adjacent siding planks 12. FIGS. 2 and 2a illustrate alternative short and long barbed flange or foot members 14 and 16, respectively, again, selected according to the requirements of the particular wall siding material employed.

FIG. 1 further illustrates the universal character of the present clip 10 wherein both a vertical or 'drop' cable 18 and a horizontal or 'span' cable 20 may be accommodated and attached to the wall surface utilizing a single retaining clip 10.

Referring to FIG. 2, clip 10 is shown positioned on the outer wall surface with its integral foot member 14 captured within the recess 22 defined between the adjacent and overlapping upper and lower siding planks 12a and 12b, respectively. As best illustrated in FIG. 2, the height of clip 10—defined generally as the distance from the base or foot member 14,16 of the clip to the end of the cradle portion 26—is advantageously selected to effect the 'stand-off' of vertical 'drop' cable 18, that is, to position cable 18 sufficiently outwardly of the wall surface (leftward as viewed in FIG. 2) such that mechanical interference between the vertically oriented cable 18 and the respective lateral upper planks 12a is thereby avoided. Note, in particular, the positioning of cable 18 with respect to the point of furthest outward extension 28 of plank 12a.

Vertical drop cable 18 is top-mounted to clip 10 through the employment of a conventional cable tie 30 which, in turn, is threaded through a channel 32 defined and integrally formed within clip 10 during the molding thereof. The curved outer surface 33 (FIG. 3) of cradle 26 serves to securely restrain and retain the cable 18 in the cradle while facilitating attachment of cables of widely varying diameters and cross-sectional contours. Cables 18 may be removed or additional or multiple cables may be positioned within the top cradle area, without need to replace or reinstall clip 10, by the simple replacement of the cable tie 30 associated therewith.

Cradle 26 is supported in its position above channel 32 by three support members including opposed support legs 27 on one side of the channel and by the third support leg 29 on the other side of channel 32. Although other support arrangements may be employed, for example the cantilever armature of the horizontal cable attachment described below, use of the three support legs 27,29 has been found to provide excellent strength characteristics while not interfering with the desired objective of inexpensive, simple-tool injection molding. It will be observed that the three legs are oriented and dimensioned such that a simple parting mold (i.e. without core members or side actions) may be employed with the mold halves retracted vertically outwardly (as viewed in FIG. 4) to release the clip part therein. Line 42 (FIG. 4) illustrates a preferred mold parting line to effect clip fabrication.

It will be appreciated that clip 10 additionally functions in a stress-relief, load-bearing capacity by reason of the wedging of foot member 14,16 into recess 22 and the corresponding, intrinsic resistance of the clip, once so-wedged, to either torsional or lineal movement.

Horizontal or 'span' cables 20 are side-mounted to the lower region of the clip, i.e. the region in closer proximity to the clip foot member 14,16 and the wall surface 12b (toward the right as viewed in FIG. 2). In this manner such horizontal cables 20 are inherently protected—generally less subjected to wind and precipitation—by the supertending plank 12a immediately above and adjacent thereto.

Conventional cable ties 34 are also employed to secure the horizontal cable spans to the clip. More specifically, and as best shown in FIGS. 2 and 3, cable 20 is secured by tie 34 to an integral armature-like cantilever member 36 which extends laterally from the clip, in a direction parallel to that of the horizontal cable 20 being attached thereto. A raised portion or ridge 38 is formed on the distal end of armature 36 to preclude the axial movement and disengagement of tie 34 from the armature once excess cable tie slack has been removed. It will be appreciated that prior to such tightening, the open-ended character of the cantilever armature 36 permits the removal and reinstallation of the horizontal cable or cable bundle onto the clip as required during cable installation.

Alternatively, where additional strength may be required, a dual supported armature may be substituted for the cantilever armature 36 previously described. In this alternative arrangement the distal end of armature 36 will be formed and integrally molded into the clip body in substantially the same manner as the proximal end of the clip shown in the figures.

As best shown in FIG. 2, the horizontal cables 20 are side-mounted to the clip thereby facilitating the installation, alteration, and/or removal of the cables following insertion of the clip to the wall surface and whether or not vertical cable runs have already been installed. The clip is contoured and dimensioned in the horizontal cable retention region 40 adjacent armature 36 (see FIGS. 2 and 2a) to permit retention of cables of widely varying cross-section and diameter and to rigidly retain such cables, as mentioned, in close proximity to the lower (inner) wall surface 12b. Specifically, the sloped surface 41 serves to guide and retain plural cables and cables of virtually any cross-section and diameter in the cable receiving region 40 toward the lower portion of the clip, that is, near the wall surface as defined by flange 14,16.

By reference to the several figures, in particular FIGS. 3, 4 and 6, it can be seen that the present clip is advantageously designed to facilitate injection molding fabrication without resort to expensive core inserts, side actions, slides and/or locks. Dotted line 42 is a preferred mold parting line that facilities the above-noted inexpensive mold design. Scrutiny of the several figures reveals the carefully developed topology of the present clip whereby none of the structural support or other members (e.g. legs 27,29 and armature 36) 'overlap' in any manner whereby a simple, non-cored tool could not be used.

What is claimed is:

1. Clip apparatus for attaching vertically and horizontally disposed wires and cables to a building wall, said wall comprised of plural overlapping longitudinal siding members and defining a longitudinal recess between adjacent siding members in the region of said overlapping; the clip apparatus including flange means for insertion into the longitudinal recess thereby affixing the clip to the building wall; first horizontal cable attaching means for securing generally horizontal cable spans to the clip; second vertical cable attaching means for securing generally vertical cable drops to the clip; said first and second attaching means being spaced respective first and second distances outwardly from the flange means and building wall surface whereby a single clip may be used for the simultaneous attachment of both horizontal and vertical cables without physical interference therebetween; the first distance for the horizontal attaching means is less than the second distance for the vertical attaching means and whereby said first distance is selected such that cables retained by the horizontal attachment means are positioned immediately adjacent the means for affixing the clip to the building wall whereby the overlapping siding member may provide protection of such cables.

2. Clip apparatus for attaching vertically and horizontally disposed wires and cables to a building wall, said wall comprised of plural overlapping longitudinal siding members and defining a longitudinal recess between adjacent siding members in the region of said overlapping; the clip apparatus including flange means for insertion into the longitudinal recess thereby affixing the clip to the building wall; first horizontal cable attaching means for securing generally horizontal cable spans to the clip; second vertical cable attaching means for securing generally vertical cable drops to the clip; said first and second attaching means being spaced respective first and second distances outwardly from the flange means and building wall surface whereby a single clip may be used for the simultaneous attachment of both horizontal and vertical cables without physical interference therebetween; the second distance for the vertical attaching means is greater than the first distance for the horizontal attaching means and whereby said second distance is selected such that cables retained by the vertical attachment means are positioned outwardly from the means for affixing the clip to the building wall whereby said cables are spaced sufficiently from the wall surface to thereby avoid interference between such vertical drop cables and the overlapping siding members.

3. Clip apparatus for attaching vertically and horizontally disposed wires and cables to a building wall, said wall comprised of plural overlapping longitudinal siding members and defining a longitudinal recess between adjacent siding members in the region of said overlapping; the clip apparatus including flange means for insertion into the longitudinal recess thereby affixing the clip to the building wall; first horizontal cable attaching means for securing generally horizontal cable spans to the clip; second vertical cable attaching means for securing generally vertical cable drops to the clip; said first and second attaching means being spaced respective first and second distances outwardly from the flange means and building wall surface whereby a single clip may be used for the simultaneous attachment of both horizontal and vertical cables without physical interference therebetween; the horizontal cable attaching means includes side-mounting means for attaching the cables to the side of the clip apparatus whereby said cables may be attached, removed, or additional cables attached or removed without causing interference to, or requiring the removal of, vertical cables attached to the clip apparatus.

4. The clip apparatus of claim 3 wherein the side-mounting means includes an armature disposed generally parallel to the horizontal cable spans to be attached thereto, the armature being adapted to receive a cable tie therearound whereby one or more cables of varying cross-section and diameter may be secured thereto.

5. The clip apparatus of claim 4 further including horizontal cable span receiving region adjacent the armature; the cable receiving region being defined by the contour of the clip apparatus and having a sloped surface spaced further from the flange means than the armature whereby one or more cables of varying cross-section and diameter may be secured in said receiving region and when so secured shall be retained in fixed relationship generally proximal to the lower portion of the clip as defined by the flange means.

6. Clip apparatus for attaching vertically and horizontally disposed wires and cables to a building wall, said wall comprised of plural overlapping longitudinal siding members and defining a longitudinal recess between adjacent siding members in the region of said overlapping; the clip apparatus including flange means for insertion into the longitudinal recess thereby affixing the clip to the building wall; first horizontal cable attaching means for securing generally horizontal cable spans to the clip; second vertical cable attaching means for securing generally vertical cable drops to the clip; said first and second attaching means being spaced respective first and second distances outwardly from the flange means and building wall surface whereby a single clip may be used for the simultaneous attachment of both horizontal and vertical cables without physical interference therebetween; the vertical cable attaching means includes top-mounting means for attaching the cables to the top of the clip apparatus whereby said cables may be attached, removed, or additional cables attached or removed without causing interference to, or requiring the removal of, horizontal cables attached to the clip apparatus.

7. The clip apparatus of claim 6 wherein the top-mounting means includes a cradle having a sloped surface for receiving cables thereon, the cradle being spaced outwardly from the flange means by plural legs, a channel for receiving cable ties being defined inwardly of the cradle generally between the legs whereby cables may be affixed to the sloped surface of the cradle and whereby said sloped surface further defines a region to receive one or more cables of varying cross-section and diameter and to limit the movement of such cables transversely to the longitudinal axis of such cables.

8. The clip apparatus of claim 7 in which the cradle is spaced outwardly from the flange means by three legs, the channel for receiving cable ties being defined by said three legs whereby two of the legs are spaced at opposed ends of the channel on one side thereof and whereby the third leg is generally centered along the length of the channel on the other side thereof and whereby the length of the third leg in the direction of the longitudinal axis of said channel is less than the spacing between the two opposed legs whereby injection molding tooling may be parted and withdrawn perpendicularly to the channel axis without first removing core members or withdrawing side actions whereby the clip apparatus may be manufactured inexpensively.

* * * * *